(12) United States Patent
Bolander et al.

(10) Patent No.: US 7,231,907 B2
(45) Date of Patent: Jun. 19, 2007

(54) VARIABLE INCREMENTAL ACTIVATION AND DEACTIVATION OF CYLINDERS IN A DISPLACEMENT ON DEMAND ENGINE

(75) Inventors: Thomas E. Bolander, Flint, MI (US); Alexander J. Roberts, Commerce Township, MI (US)

(73) Assignee: General Motors Corporation, Detroit, MI (US)

( * ) Notice: Subject to any disclaimer, the term of this patent is extended or adjusted under 35 U.S.C. 154(b) by 154 days.

(21) Appl. No.: 11/017,364

(22) Filed: Dec. 20, 2004

(65) Prior Publication Data

US 2006/0130814 A1 Jun. 22, 2006

(51) Int. Cl.
 *F02D 13/06* (2006.01)
 *F02D 17/02* (2006.01)
(52) U.S. Cl. .................................. 123/481; 123/198 F
(58) Field of Classification Search ................. 123/481, 123/198 F
 See application file for complete search history.

(56) References Cited

U.S. PATENT DOCUMENTS

| | | | |
|---|---|---|---|
| 5,374,224 A * | 12/1994 | Huffmaster et al. ......... 477/181 |
| 5,720,257 A * | 2/1998 | Motose et al. ......... 123/339.14 |
| 6,513,471 B1 | 2/2003 | Hicks | |
| 6,557,518 B1 | 5/2003 | Albertson et al. | |
| 6,584,951 B1 | 7/2003 | Patel et al. | |
| 6,619,267 B1 * | 9/2003 | Pao ............................ 123/481 |
| 6,655,353 B1 | 12/2003 | Rayl | |
| 6,681,734 B2 | 1/2004 | Albertson | |
| 6,736,108 B2 | 5/2004 | Rayl et al. | |
| 6,739,314 B1 | 5/2004 | Bauerle et al. | |
| 6,760,656 B2 | 7/2004 | Matthews et al. | |
| 6,763,297 B1 | 7/2004 | Stahl et al. | |
| 6,769,403 B2 | 8/2004 | Rayl et al. | |
| 6,782,855 B1 | 8/2004 | Albertson et al. | |
| 7,072,758 B2 * | 7/2006 | Kolmanovsky et al. ..... 701/103 |
| 2003/0131820 A1 * | 7/2003 | Mckay et al. ............ 123/198 F |
| 2003/0213468 A1 * | 11/2003 | Rayl et al. ............. 123/406.26 |
| 2004/0206072 A1 * | 10/2004 | Surnilla et al. ................ 60/285 |

* cited by examiner

*Primary Examiner*—Erick Solis
(74) *Attorney, Agent, or Firm*—Christopher DeVries

(57) ABSTRACT

A method of regulating displacement in a displacement on demand engine includes determining a desired engine displacement and determining a current engine displacement. The method further includes adjusting activation of a first cylinder to partially achieve the desired engine displacement and subsequently adjusting activation of a second cylinder to fully achieve the desired engine displacement from the current engine displacement. The method adjusts activation of the cylinders one at a time to reduce vibration in the engine.

18 Claims, 5 Drawing Sheets

VARIABLE INCREMENTAL ACTIVATION AND DEACTIVATION OF CYLINDERS IN A DISPLACEMENT ON DEMAND ENGINE

FIELD OF THE INVENTION

The present invention relates to internal combustion engines, and more particularly to engine control systems that control cylinder activation and deactivation in a displacement on demand engine.

BACKGROUND OF THE INVENTION

Some internal combustion engines include engine control systems that deactivate cylinders under low load situations. For example, an eight-cylinder engine can be operated using four cylinders to improve fuel economy by reducing pumping losses. This process is generally referred to as displacement on demand or DOD. Operation of the engine using all of the engine cylinders is referred to as an activated mode. A deactivated mode, in contrast, refers to operation using less than all of the cylinders of the engine (i.e., one or more cylinders not active).

In the deactivated mode, there are less cylinders operating. As a result, there is less drive torque available to drive the vehicle driveline and accessories, such as an alternator, a coolant pump or an air conditioning compressor. Engine efficiency, however, is increased because of decreased fuel consumption (i.e., no fuel supplied to the deactivated cylinders) and decreased engine pumping. Because the deactivated cylinders do not take in and compress fresh intake air, pumping losses are reduced.

Movement between the activated mode and the deactivated mode has the potential to increase noise, vibration and harshness in the engine, which may be transmitted to the driver. In addition, conventional DOD systems move between a full array of cylinders and half of the cylinders. For example, an eight-cylinder engine can operate with all eight cylinders in the activated mode and then reduce to four cylinders in the deactivated mode. The addition or subtraction of torque due to the activation or deactivation of multiple cylinders at a time can increase noise, vibration and harshness.

SUMMARY OF THE INVENTION

A method of regulating displacement in a displacement on demand engine that includes determining a desired engine displacement and determining a current engine displacement. The method further includes adjusting activation of a first cylinder to partially achieve the desired engine displacement and subsequently adjusting activation of a second cylinder to fully achieve the desired engine displacement from the current engine displacement.

In one feature, the method includes delaying adjusting activation of the second cylinder for a predetermined time period based on an engine timing to reduce vibration.

In another feature, the method includes adjusting activation of the second cylinder occurs after adjusting activation of the first cylinder and after a predetermined amount of engine timing pulses.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE VARIOUS EMBODIMENTS

The following description of the various embodiments is merely exemplary in nature and is in no way intended to limit the invention, its application or uses. As used herein, the term module, submodule, control module and/or device refers to an application specific integrated circuit (ASIC), an electronic circuit, a processor (shared, dedicated, or group) and memory that executes one or more software or firmware programs, a combinational logic circuit, or other suitable components that provide the described functionality. Moreover, vehicle controllers may communicate with various vehicle systems using digital or analog inputs and outputs and/or an automotive communications network including, but not limited to, the following commonly used vehicle communications network standards: CAN, SAE J1850, and GMLAN.

Figure 1:
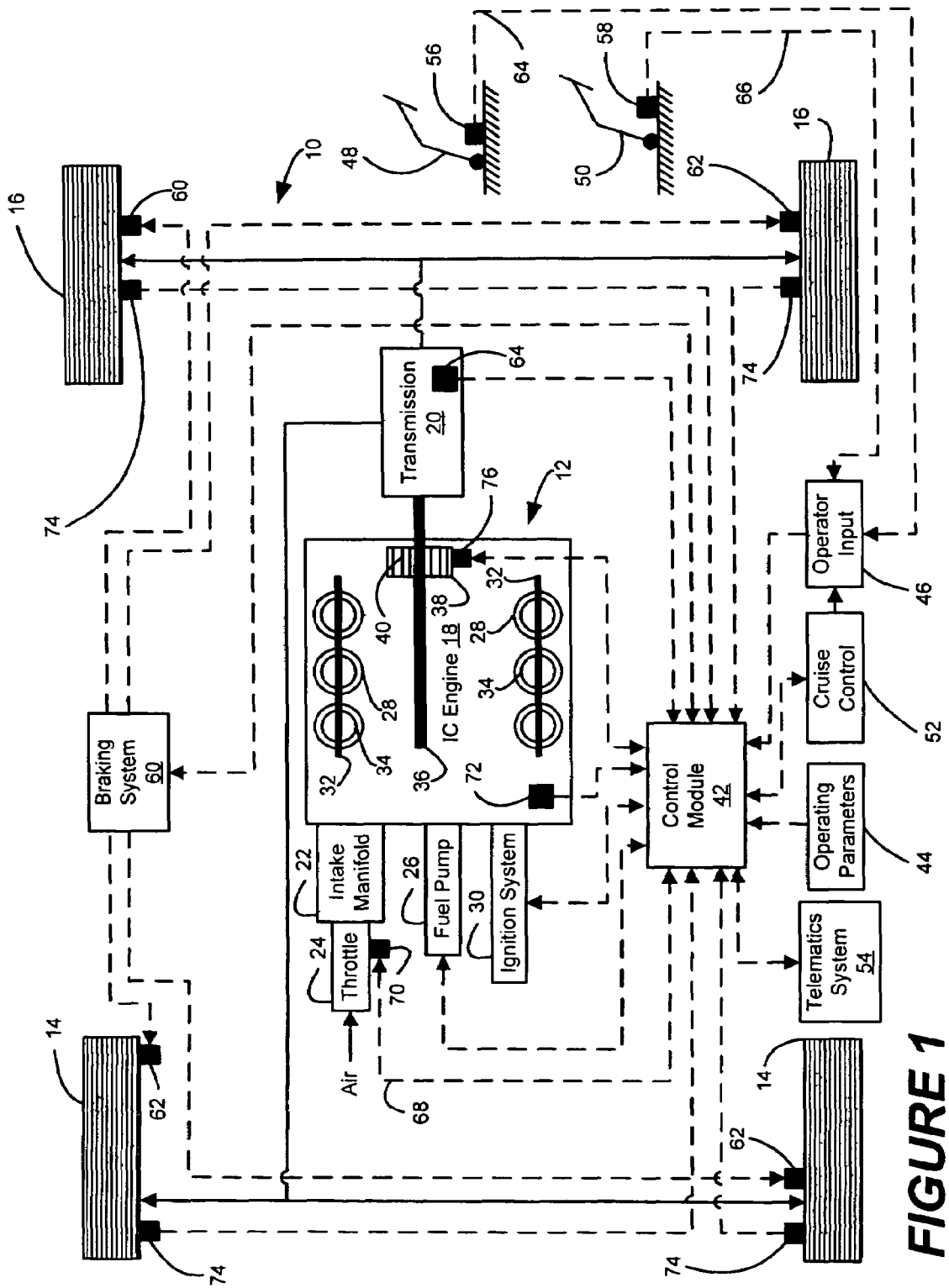
FIG. 1 is a schematic diagram illustrating a vehicle including an exemplary control module constructed in accordance with the teachings of the present invention.

Referring now to FIG. 1, a vehicle 10 includes an engine system 12, driven wheels 14 and optionally-driven wheels 16. The engine system 12 produces a torque output to drive the driven wheels 14 and to optionally drive the wheels 16. The engine system 12 includes an internal combustion engine 18 connected to a transmission 20. The internal combustion engine 18 includes an intake manifold 22 and a throttle 24. Air flow into the intake manifold 22 is regulated by the throttle 24. The air flow from the intake manifold 22 and fuel from a fuel pump 26 is ignited in a plurality of cylinders 28 by an ignition system 30. A valve train 32 assists in, among other things, regulation of combustion in the cylinders 28. Combustion in each of the cylinders 28 drives a piston 34, which rotatably drives a crankshaft 36. While internal combustion engines utilizing a spark ignition are described, the present invention applies to diesel and other sparkless and throttleless compression ignition engines.

A timing wheel 38 is connected to the crankshaft 36. The timing wheel 38 contains a plurality of timing teeth 40 that individually correspond to respective crankshaft positions. It is appreciated that in the some embodiments, the timing wheel 38 contains sixty timing teeth 40. As such, each timing tooth 40 corresponds to approximately six degrees of crankshaft rotation. It will be additionally appreciated that the number of timing teeth 40 on the timing wheel 38 and crankshaft rotation per tooth 40 can vary.

A control module 42 controls operations of the vehicle 10 based on various vehicle operating parameters 44 and operator inputs 46. While a single control module 42 is shown, one or more control modules may be used. The vehicle operating parameters 44 can include environmental indicators such as humidity, temperature or air pressure. The vehicle operating parameters 44 can also include a powerplant profile and a powerplant status that indicates, for example, a cold engine signal or other engine specific faults. The powerplant profile can include lookup data that indicates, for example, a maximum brake torque output and torque output based on spark retardation, engine speed and effects of the environmental indicators on engine power. The operator inputs 46 include an accelerator pedal 48, a brake pedal 50, a cruise control system 52 and other controls that, for example, provide additional accessibility for disabled drivers. A telematics system 54, such as OnStar® can also provide input and receive output from the control module 42.

The accelerator pedal 48 is movable between a plurality of positions, which are detected by an accelerator pedal position sensor 56. Generally, the accelerator pedal 48 is positioned to indicate a driver torque request. The brake pedal 50 is similarly movable between a plurality of positions, which are detected by a brake pedal position sensor 58. Generally, the brake pedal 50 is positioned to regulate a braking system 60 that reduces the speed of the vehicle 10. The braking system 60 engages a plurality of braking components 62 such as calipers to clamp brake rotors (not shown) attached to the wheels 14, 16. The cruise control system 52 can be optionally engaged to control the speed of the vehicle 10 by various control systems known in the art.

The accelerator pedal position sensor 56 generates an acceleration pedal position signal 64 that is communicated to the control module 42. Similarly, the brake pedal position sensor 58 generates a brake pedal position signal 66 that is also communicated to the control module 42. The control module 42 generates a throttle control signal 68 that is sent to a throttle actuator 70 to regulate the throttle 24. An engine speed sensor 72 generates a speed signal for the internal combustion engine 18 that is communicated to the control module 42. Wheel speed sensors 74 generate wheel speed signals and a transmission speed sensor 64 generates a transmission speed signal, both of which are communicated to the control module 42.

The control module 42 determines instantaneous engine speed at a predetermined crankshaft position based on the engine speed signal. In addition, the control module 42 can detect crankshaft position and associate a crankshaft position with events in the engine. Engine events for example, can include, but are not limited to, injecting fuel into cylinder, opening/closing valves of a cylinder and/or firing a spark plug. As such, the control mode 42 can correlate each engine event with a respective crankshaft position. The timing wheel sensor 76 and the engine speed sensor 72, therefore, are able to communicate with the control module 42 and provide a crankshaft angle and the associated timing tooth 40 for each engine event. The internal combustion engine 18 can operate at a range of engine speeds. The engine 18, for example, can operate at an idle engine speed, partial load or full power. It is appreciated that in controlling ignition, throttle and fuel delivery, the control module 42 can activate or deactivate a plurality of switches, solenoids or controls to control combustion in the engine 18.

Figure 2A:
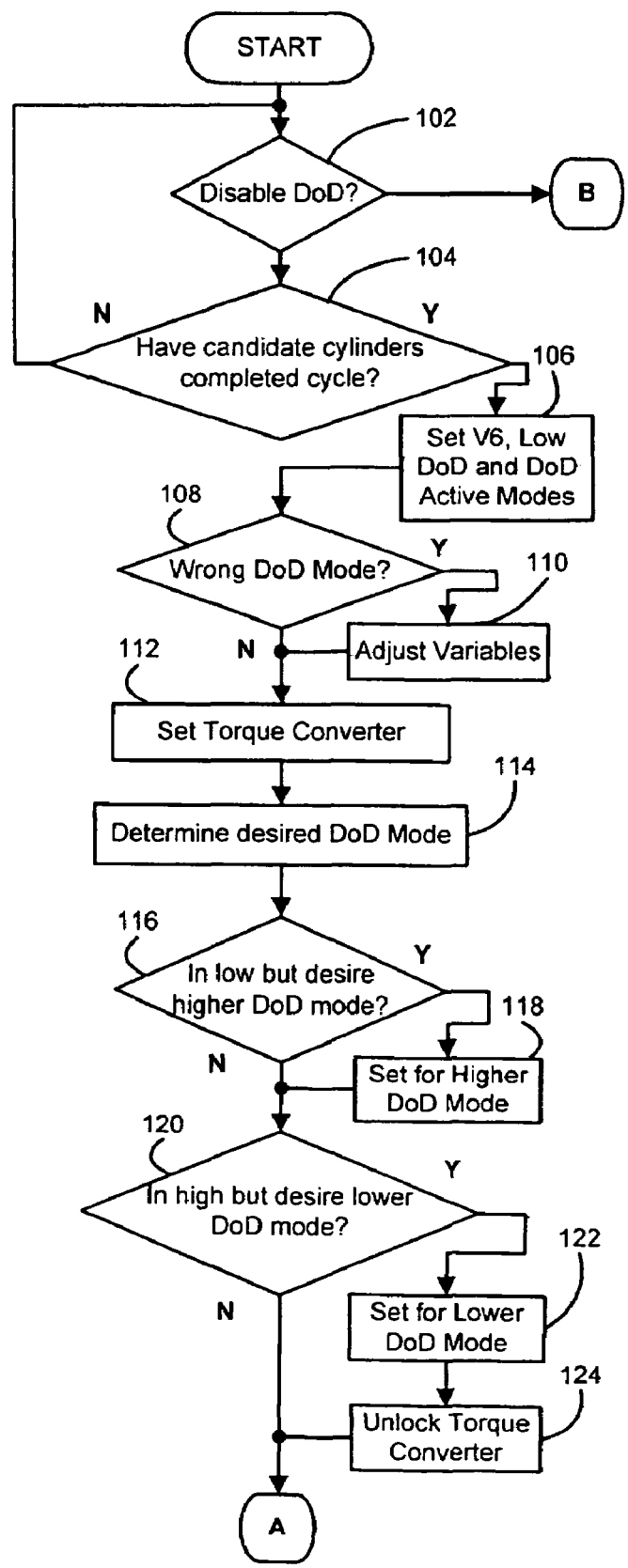
FIGS. 2A and 2B are a flow chart illustrating an exemplary displacement on demand control system constructed in accordance with the teachings of the present invention.
Figure 2B:
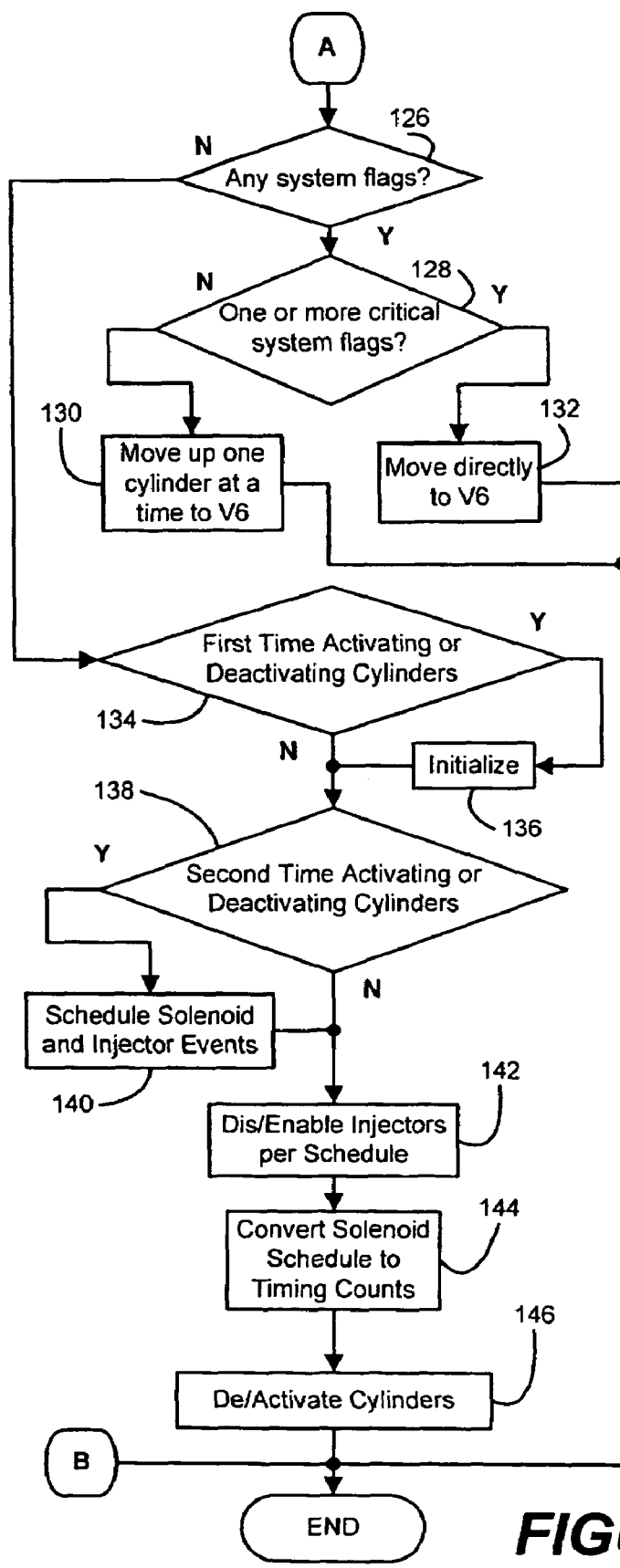

With reference to FIGS. 2A and 2B, a variable displacement on demand control system determines a suitable engine displacement and incrementally activates or deactivates individual cylinders to achieve the suitable engine displacement. A lifter oil manifold assembly is implemented to activate and deactivate the individual cylinders of the engine. The lifter oil manifold assembly includes a series of lifters and solenoids associated with the corresponding cylinders. The solenoids are selectively energized to enable hydraulic fluid flow to the lifters to inhibit valve lifter operation, thereby deactivating the corresponding cylinders. The solenoids remain energized while the engine operates in the deactivated mode. Moreover, fuel flow can be deactivated to the individual cylinders in the deactivated mode.

In step 102, control determines whether the displacement on demand system should be disabled. The displacement on demand system is disabled whenever the vehicle is in a situation where activation of the displacement on demand (DOD) system would be inappropriate. Inappropriate situations include, for example, the vehicle is in a transmission mode other than drive (i.e. park, reverse or low range). Other situations include the presence of engine controller faults, cold engine, improper voltage levels and improper fuel and/or oil pressure levels. When the DOD system is disabled control ends. When the DOD system is not disabled, control continues with step 104.

In step 104, control determines whether candidate cylinders have completed their cycle. In a four-stroke engine, for example, a cycle refers to two strokes: one stroke being a compression stroke and the other stroke being an exhaust stroke. Candidate cylinders refer to cylinders that can be activated and deactivated in a DOD system. When the candidate cylinders have completed their cycle, control continues with step 106. When the candidate cylinders have not completed their cycle, control loops back to step 102. It is appreciated that the DOD system, as illustrated, can control a six-cylinder engine. As such, the DOD system can incrementally activate or deactivate up to three candidate cylinders. The three candidate cylinders can be any of the cylinders in the six-cylinder engine. It is also appreciated that the DOD control is applicable to engines with a multitude of cylinders, such as 3, 4, 5, 6, 7, 8, 9, 10, 12, 16, etc.

In step 106, control sets a V6 mode, a low range DOD mode and a DOD active mode. As noted above, control is applicable to variable engine configurations such that any amount of cylinders can be used. In a V8 engine, for example, step 106 would set a V8 mode accordingly. The low DOD mode and DOD active modes are flags that indicate that the system is active and that cylinder deactivation is possible. In step 108, control determines whether the displacement on demand mode is incorrect. The DOD mode is compared to the engine to determine whether the DOD mode matches what is actually occurring in the engine. When control determines that the DOD mode is incorrect, control continues with step 110. When control determines that the displacement on demand mode is correct, control continues with step 112. In step 110, control adjusts the applicable system variables to align system setting with actual engine conditions. In step 112, control sets torque converter slippage commensurate with the current DOD mode.

Figure 3A:
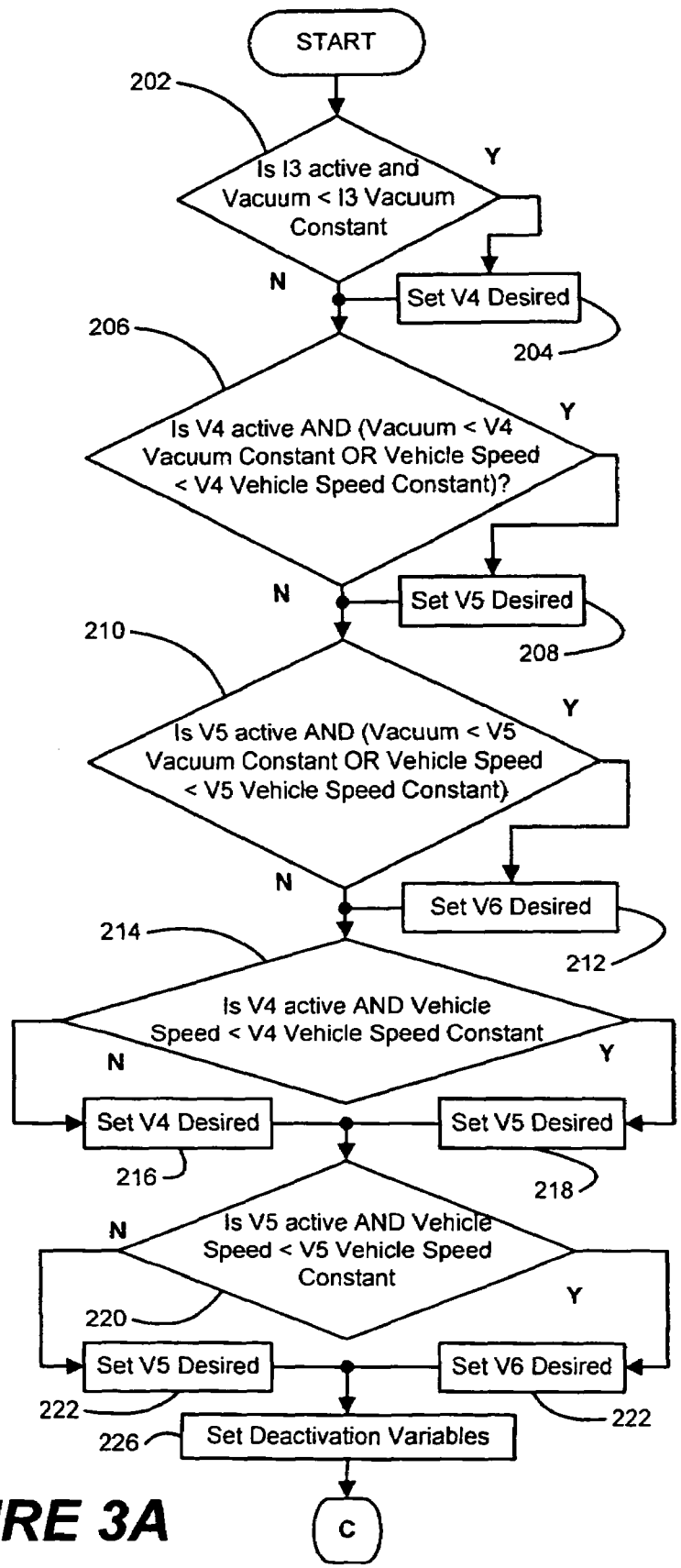
FIGS. 3A and 3B are flow charts illustrating exemplary steps that are performed by the system illustrated in FIGS. 2A and 2B.
Figure 3B:
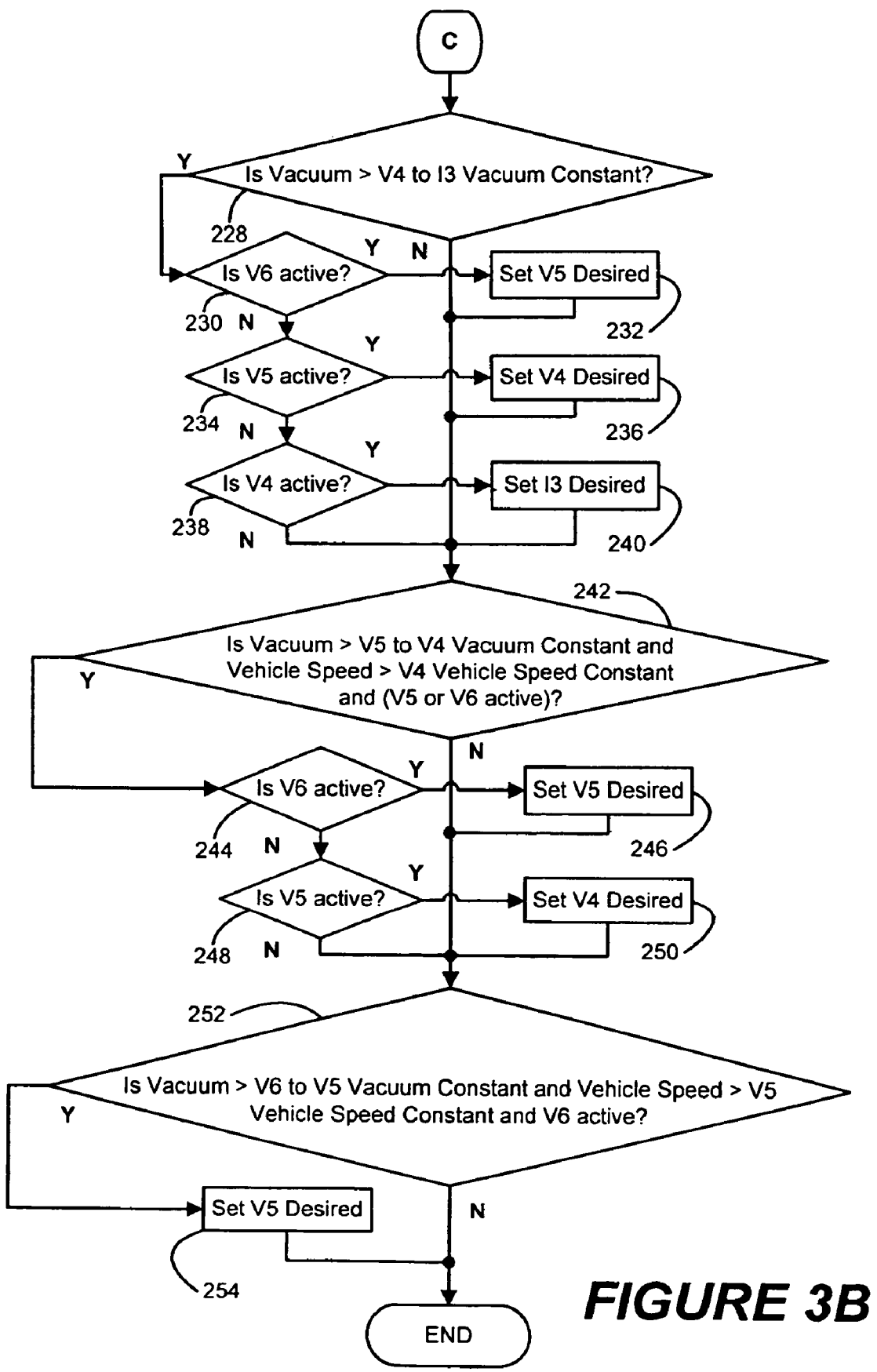

In step 114, control determines the desired DOD mode. The determination of the desired DOD mode is illustrated in FIGS. 3A and 3B such that control proceeds to step 202 in FIG. 3A and upon ending in FIG. 3B, control continues with step 116 in FIG. 2B. Control, as illustrated in FIGS. 3A and 3B, provides a desired DOD mode. The determination of the desired DOD mode as illustrated in FIGS. 3A and 3B is explained below in greater detail.

In step 116, control determines when a higher DOD mode is desired when control is in a lower DOD mode. When a higher DOD mode is desired, control continues with step 118. When a higher DOD mode is not desired, control continues with step 120. In step 118, a system flag is set for a higher DOD mode. In step 120, control determines when a lower DOD mode is desired when control is in a higher DOD mode. When a lower DOD mode is desired, control continues with step 122. When a lower mode is not desired, control continues with step 126. In step 122, a system flag is set for a lower DOD mode. In step 124, control can unlock the torque converter or adjust slip accordingly in preparation for a lower DOD mode. It can be appreciated that a lower DOD mode refers to a DOD mode where fewer cylinders are in the activated mode relative to the current DOD mode. In contrast, a higher DOD mode refers to a DOD mode where more cylinders are in the activated mode relative to the current DOD mode. It will be further appreciated that no lower DOD mode exists when all of the candidate cylinders have been deactivated and no higher DOD mode exists when all of the candidate cylinders have been activated.

In step 126, control determines when any system flags have been set. System flags may include, for example, improper voltage, improper oil pressure, low/high engine temperature, improper gear, engine malfunctions, improper responses to DOD demands. It is appreciated that system flags can be specific to the vehicle, control system and the network used therein. As such, myriad system flags may be used to indicate the health, status and current conditions of the engine. Critical system flags can indicate an engine problem that may lead to damage of engine or vehicle. A system flag, for example, may indicate the engine operating above a normal temperature, while a critical system flag may indicate the temperature is hot enough to cause engine damage. Moreover, critical system flags can indicate a situation where a wide-open throttle is demanded. Furthermore, system flags and/or critical system flags may be set by the telematics system.

When control determines that more than one system flag is set, control continues with step 108. When control determines that no system flags have been set control continues with step 134. In step 128, control determines when more than one critical system flags have been set. When no critical system flags have been set, control continues with step 130. When one or more critical system flags have been set, control continues with step 132. In step 130, control activates otherwise deactivated cylinders one at a time to move the engine from its current displacement to a full V6. Control then ends. In step 132, control activates all otherwise deactivated cylinders to move the engine displacement from its current displacement to a full displacement. Control then ends.

In step 134, control determines whether this is the first time control has activated or deactivated cylinders. When control has activated or deactivated cylinders for the first time, control continues with step 136. When this is not the first time control has activated or deactivated cylinders, control continues with step 138. In step 136, control initializes the system for either activation or deactivation of cylinders. In step 138, control determines whether this is the second time control has activated or deactivated cylinders. When control has activated or deactivated cylinders for the second time, control continues with step 140. When this is neither the first nor the second time control has activated or deactivated cylinders, control continues with step 142. In step 140, control schedules valve solenoid and fuel injector events. In step 142, control disables or enables fuel injectors per the schedule from step 140. In step 142, control converts the solenoid schedule to timing counts based on the engine timing. The timing counts correspond to suitable locations in the engine timing sequence to minimize noise vibration and harshness telegraphed to the driver and throughout the vehicle. In step 146, control activates or deactivates cylinders by activating and deactivating solenoids at the appropriate timing count, which will reduce displacement or increase displacement of the engine.

It is appreciated that control of DOD system can be divided into three sub modules. As such, step 102 through step 132 (inclusive of steps 202-254) can be executed by a first module, while step 134 through 144 are executed by a second module, while step 146 is executed by a third module. The three modules operate at different loop speeds. The first module can be configured to loop once every twelve and one-half milliseconds. It is appreciated that the twelve and one-half millisecond time frame is independent of any engine timing and independent of the other two modules. The second module can be configured to be dependant on engine timing. For example, the second module can be configured such that one event per candidate cylinder occurs per 360° of crankshaft rotation. In a V6, for example, with three cylinders that are candidates for activation and deactivation six events are logged for the three cylinders per every complete engine cycle (i.e. 720° of crankshaft rotation). It is appreciated that in the second submodule solenoid, fuel injector and other DOD controls can be scheduled to be switched on or off in the time frame of the second submodule.

In the first submodule, therefore, it is determined whether DOD components should be switched on or off as a DOD mode is determined. In the second submodule, the desired mode is converted to a schedule based on the timing of a specific engine. In the third submodule, control solely determines the exact point in the engine timing in which to switch on or off the DOD components. The third module records eight events per cylinder for every 360° of crankshaft rotation. In a complete engine cycle (i.e. 720° of engine rotation) for three candidate cylinders, the third submodule records 48 engine timing pulses. Control determines, per the schedule from the second submodule, when to activate or deactivate the cylinders at a certain engine timing pulse or engine event per the third submodule. It is appreciated that the coordinate of the submodules allows the system to activate or deactivate cylinder at the optimal time in the engine timing to reduce noise, vibration and harshness from the engine that can be telegraphed to the driver.

With reference to FIGS. 3A and 3B, the steps executed to determine the desired DOD mode will be discussed in detail. It will be appreciated that the flow chart as illustrated in FIGS. 3A and 3B is contained within step 114 and is executed in whole. Once control ends in FIG. 3B, control continues with step 126 of FIG. 2B as above discussed.

In step 202, control determines whether the in-line-three mode is active and the vacuum is less than the in-line-three mode vacuum constant. When the in-line-three mode is active and the vacuum is less than the in-line-three mode vacuum constant, control continues with step 204. Otherwise, control continues with step 206. In step 204, the V4 desired flag is set. In step 206, control determines whether the V4 mode is active and the vacuum is less than the V4 vacuum constant or vehicle speed is less than the V4 vehicle speed constant. When the V4 mode is active and either the vacuum is less than the V4 vacuum constant or vehicle speed is less than the V4 vehicle speed constant, control continues with step 208. When either the V4 mode is not active or the vacuum is greater than the V4 vacuum constant or vehicle speed is greater than the V4 vehicle speed constant, control continues with step 210. In step 208, the V5 desired flag is set. It is appreciated that the vacuum is a measure of pressure in the engine, such that at given engine speeds and loads pressure within the engine can be below ambient pressure. The various DOD mode vacuum constants are based on a pressure determined in a specific engine at a current displacement, such that an in-line-three mode will have a given vacuum.

In step 210, control determines whether the V5 mode is active and either the vacuum is less than the V5 vacuum constant or vehicle speed is less than the V5 vehicle speed constant. When the V5 mode is active and either the vacuum is less than the V5 vacuum constant or vehicle speed is less than the V5 vehicle speed constant, control continues with step 212. When the V5 mode is not active or the vacuum is greater than the V5 vacuum constant or vehicle speed is greater than the V5 vehicle speed constant, control continues with step 214. In step 212, the V6 desired flag is set.

In step 214, control determines whether the V4 mode is active and vehicle speed is less than the V4 vehicle speed constant. When either the V4 mode is not active or vehicle speed is greater than the V4 vehicle speed constant, control continues with step 216. When the V4 mode is active and vehicle speed is less than the V4 vehicle speed constant, control continues with step 218. In step 216, the V4 mode desired flag is set. From step 216, control continues with step 220. In step 218, the V5 mode desired flag is set.

In step 220, control determines whether the V5 mode is active and vehicle speed is less than V5 vehicle speed constant. When either the V5 mode is not active or vehicle speed is greater than the V5 vehicle speed constant, control continues with step 222. From step 222, control continues with step 226. In step 224, the V6 mode desired flag is set. In step 226, control sets system variables based on current DOD mode. Unless a DOD mode is determined in step 202 through step 222, it is appreciated that a lower DOD mode can be selected in step 228 through step 254, in contrast to a higher DOD mode being selected in steps 202 through step 222.

In step 228, control determines whether the vacuum is greater than the V4 to in-line-three vacuum constant. When the vacuum is greater than the V4 to in-line-three vacuum constant, control continues with step 230. When the vacuum is less than the V4 to in-line-three vacuum constant, control continues with step 242. In step 230, control determines whether the V6 mode is active. When the V6 mode is active, control continues with step 232. When the V6 mode is not active, control continues with step 234. In step 232, the V5 mode desired flag is set. From step 232, control continues with step 242. In step 234, control determines whether the V5 mode is active. When the V5 mode is active, control continues with step 236. When the V5 mode is not active, control continues with step 238. In step 236, the V4 mode desired flag is set. From step 236, control continues with step 242. In step 238, control determines whether the V4 mode is active. When the V4 mode is active, control continues with step 240. When the V4 mode is not active, control continues with step 242. In step 240, the in-line-three mode desired flag is set.

In step 242, control determines whether the vacuum is greater than the V5 to V4 vacuum constant, vehicle speed is greater than the V4 vehicle speed constant and is the V5 or the V6 mode active. When the vacuum is greater than the V5 to V4 vacuum constant, vehicle speed is greater than the V4 vehicle speed constant and either the V5 mode or the V6 mode is active, control continues with step 244. When either the vacuum is less than the V5 to V4 vacuum constant, vehicle speed is less than the V4 vehicle speed constant or the V5 mode or the V6 mode are not active, control continues with step 252. In step 244, control determines whether the V6 mode is active. When the V6 mode is active, control continues with step 246. When the V6 mode is not active, control continues with step 248. In step 256, the V5 desired mode flag is set. From step 246, control continues with step 252. In step 248, control determines whether the V5 mode is active. When the V5 mode is active, control continues with step 250. When the V5 mode is not active, control continues with step 252. In step 250, the V4 mode desire flag is set.

In step 252, control determines whether the vacuum is greater than the V6 to V5 vacuum constant and vehicle speed is greater than the V5 vehicle speed constant and the V6 mode is active. When the vacuum is greater than the V6 to V5 vacuum constant, vehicle speed is greater than the V5 vehicle speed constant and the V6 mode is active, control continues with step 254. When either the vacuum is less than the V6 to V5 vacuum constant, vehicle speed is less than the V5 vehicle speed constant or the V6 mode is not active, control ends. In step 254, the V5 mode desire flag is set. From step 254 control ends.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of regulating displacement in a displacement on demand engine, comprising:
   determining a desired engine displacement;
   determining a current engine displacement;
   adjusting activation of a first cylinder to partially achieve said desired engine displacement and subsequently adjusting activation of a second cylinder to fully achieve said desired engine displacement from said current engine displacement; and
   changing said engine displacement from said current engine displacement to a full engine displacement by adjusting activation of all cylinders when a critical engine fault occurs.

2. The method of claim 1 further comprising delaying adjusting activation of said second cylinder for a predetermined time period based on an engine timing to reduce vibration.

3. The method of claim 1 further comprising determining a cylinder activation schedule based on an engine timing.

4. The method of claim 1 wherein adjusting activation includes adjusting fuel injectors for a cylinder in the engine.

5. The method of claim 1 wherein adjusting activation includes adjusting an engine valve solenoid.

6. The method of claim 5 wherein adjusting an engine valve solenoid includes deactivating an engine valve to inhibit airflow through a cylinder of the engine.

7. The method of claim 1 further comprising detecting a plurality of engine timing pulses.

8. The method of claim 7 wherein said adjusting activation of said second cylinder occurs after adjusting activation of said first cylinder and after a predetermined amount of engine timing pulses.

9. An engine control system that regulates displacement in a displacement on demand engine, comprising:
   a first cylinder;
   a second cylinder; and
   a control module that determines a desired engine displacement, that determines a current engine displacement, that adjusts activation of said first cylinder to partially achieve said desired engine displacement and subsequently adjusts activation of said second cylinder to fully achieve said desired engine displacement from said current engine displacement, and that changes said engine displacement from said current engine displacement to a full engine displacement by adjusting activation of all cylinders when a critical engine fault occurs.

10. The engine control system of claim 9 wherein said control module delays adjusting activation of said second cylinder for a predetermined time period based on an engine timing to reduce vibration.

11. The engine control system of claim 10 further comprising a fuel injector connected to said first cylinder, wherein said control module adjusts activation by one of activating and deactivating said fuel injector.

12. The engine control system of claim 10 further comprising an engine valve solenoid connected to said first cylinder, wherein said control module adjusts activation by one of activating and deactivating said engine valve solenoid.

13. The engine control system of claim 12 wherein deactivation of said engine valve solenoid results in inhibiting airflow through said first cylinder.

14. The engine control system of claim 10 wherein said control module detects a plurality of engine timing pulses.

15. The engine control system of claim 14 wherein said control module adjusts activation of said second cylinder after adjusting the activation of said first cylinder and after a predetermined amount of engine timing pulses.

16. A method of regulating displacement in a displacement on demand engine, comprising:

determining a desired engine displacement;

determining a current engine displacement;

adjusting activation of a second cylinder after adjusting activation of a first cylinder and after a predetermined amount of engine timing pulses to achieve said desired engine displacement from said current engine displacement, and changing said engine displacement from said current engine displacement to a full engine displacement by adjusting activation of all cylinders when a critical engine fault occurs.

17. The method of claim 16 wherein adjusting activation includes adjusting fuel injectors for a cylinder in the engine.

18. The method of claim 16 wherein adjusting activation includes adjusting an engine valve solenoid, wherein adjusting said engine valve solenoid includes deactivating an engine valve to inhibit airflow through a cylinder of the engine.

* * * * *